W. G. LINDEMANN.
OZONIZING APPARATUS.
APPLICATION FILED FEB. 15, 1919.
1,362,999.
Patented Dec. 21, 1920.
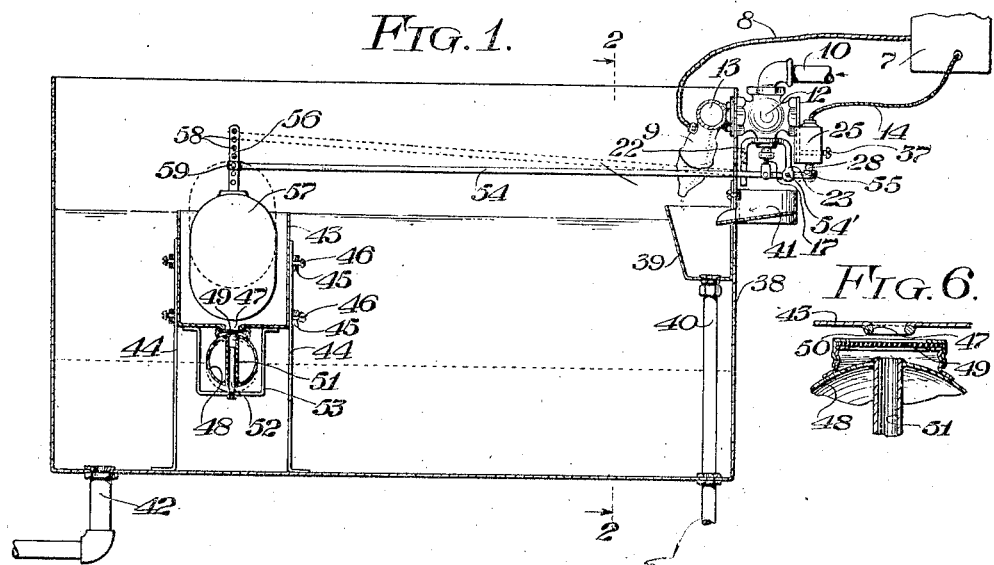
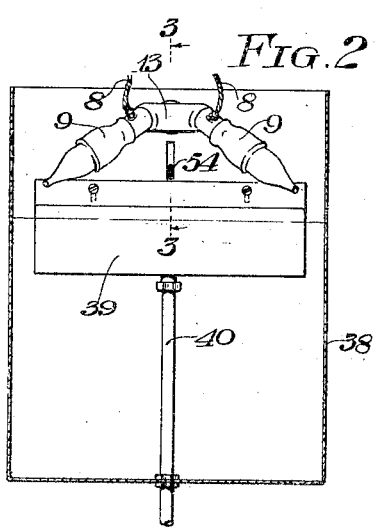
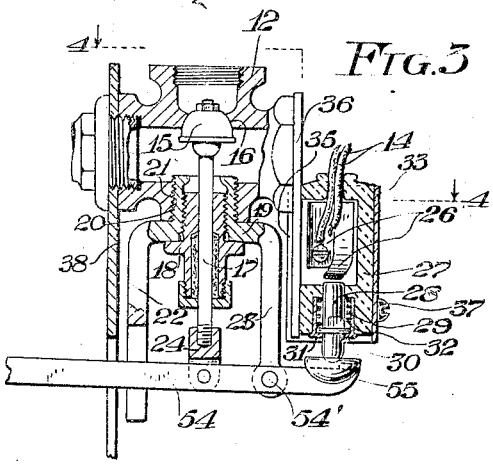
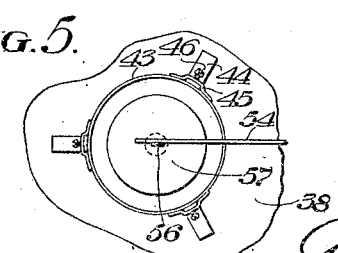
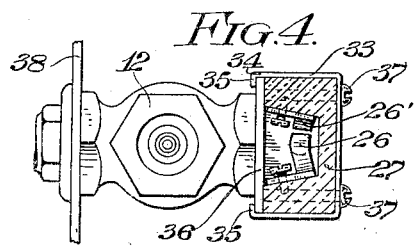
WITNESSES.
H. W. Chase
C. L. Waal
INVENTOR.
William G. Lindemann
By R. S. Caldwell
ATTORNEY.

UNITED STATES PATENT OFFICE.

WILLIAM G. LINDEMANN, OF MILWAUKEE, WISCONSIN, ASSIGNOR TO OZONE COMPANY OF AMERICA, OF MILWAUKEE, WISCONSIN, A CORPORATION OF DELAWARE.

OZONIZING APPARATUS.

1,362,999. Specification of Letters Patent. Patented Dec. 21, 1920.

Application filed February 15, 1919. Serial No. 277,295.

*To all whom it may concern:*

Be it known that I, WILLIAM G. LINDEMANN, a citizen of the United States, and resident of Milwaukee, in the county of Milwaukee and State of Wisconsin, have invented new and useful Improvements in Ozonizing Apparatus, of which the following is a description, reference being had to the accompanying drawings, which are a part of this specification.

The invention relates to float controlled means for ozonizing apparatus.

One of the objects of the invention is to provide a float mechanism for automatically controlling the passage of water to be ozonized and the turning on and off of the electric current used in the ozonizing process.

A further object of the invention is to provide a quick acting float for operating the water valve and electric switch by using a float tank of small capacity compared to the tank containing the ozonized water.

A further object of the invention is to provide a simple mechanism for automatically and simultaneously operating the water valve and an electric switch of an ozonizing apparatus.

A further object of the invention is to provide a means for permitting actuation of the float mechanism for different tank capacities.

A further object of the invention is to prevent unozonized water, dripping from the nozzle, from entering the tank when the electric current is off.

The invention further consists in the several features hereinafter set forth and more particularly defined by claims at the conclusion hereof.

In the drawings:

Figure 1 is a vertical sectional view through the device embodying the invention;

Fig. 2 is a section taken on the line 2—2 of Fig. 1;

Fig. 3 is a detail sectional view taken on the line 3—3 of Fig. 2;

Fig. 4 is a section taken on the line 4—4 of Fig. 3;

Fig. 5 is a detail plan view of the float tank; and,

Fig. 6 is an enlarged detail view of the valve shown in Fig. 1.

In the ozonizing apparatus with which the present invention is used, air from an ozonizer 7 is conducted through a pipe or pipes 8 to a mixing nozzle or nozzles 9 where it is mixed with water led from a supply pipe 10 through pipe fittings 12 and 13 to said nozzle or nozzles and the electric current for ozonizing the air passes through conductors 14. The details of the ozonizer and of the mixing nozzle have not been shown as the invention resides in the control means for the water and ozonizer and to the provision for storage of a certain amount of ozonized water.

Referring to Fig. 3, the passage of water from the pipe 10 is controlled by a valve 15 adapted to register with a seat 16 in the fitting 12 and whose stem 17 is slidably mounted in a plug 18. The plug 18 is threaded to seat in the threaded bore of a support 19 which has an exterior threaded end 20 seated in a threaded bore 21 of the fitting 12. The support 19 has a depending forked guide arm 22 and a depending supporting arm 23. The stem 17 has a forked end 24.

The construction of the mixing nozzle and the switch for controlling the passage of electric current through the ozonizing apparatus is more particularly shown and described in my copending application Serial No. 277,294 filed February 15, 1919. Briefly this switch 25 embodies two flexible contacts 26 and 26' mounted in an insulating block 27 and connected to the conductors 14 and moved into contact with each other by means of a push button 28 normally maintained in inoperative position by means of a spring 29 interposed between a shoulder 30 on the button and the block and limited in its outward movement by the flange 31 of a cap 32. A plate 33 having extensions 34 provided with inwardly extending flanges 35 is secured to the block 27 and is clamped to a plate 36 on the fitting 12 by bringing the flanges 35 in clamping engagement therewith by the tightening up of screws 37.

The fittings 12 and 13 are secured to the upper portion of one side of a tank 38. The drip from the nozzles 9 falls into a trough 39 and is conducted away through a drain pipe 40 and in case of any leakage from the valve such water is carried to the trough 39 by a drain trough 41. Thus any unozonized water dripping from the nozzle or leaking from the valve is prevented from entering the tank. A pipe 42 conducts the ozonized water from the tank.

A float tank 43 is mounted on legs 44 adjustably secured in guides 45 by set screws 46 so that said tank may be set at different elevations in the main tank 38. The tank 43 has an opening 47 in its bottom and passage of water therethrough is controlled by a ball valve 48 having a rubber face 49 detachably secured thereto and registering with the seat 50 adjacent the opening 47. The valve 48 is provided with a guide tube 51 slidable upon a vertical pin 52 carried by a bracket 53 secured to the bottom of the tank 43.

Pivotally mounted intermediate its ends upon the arm 23 by a pin 54' is the float actuated lever 54 to which the forked end 24 of the water valve is pivotally secured and which has a cup-shaped end 55 adapted to engage the end of the button 28. The other end of this lever is adjustably secured to an upright 56 carried by a float 57 disposed in the tank 43, said upright having a series of holes 58 into any one of which the pivot bolt 59 for the lever may be inserted so as to provide for different settings of the float.

The operation of the float mechanism is as follows: When the tank 38 is empty or is at the water line shown in dotted lines in Fig. 1, the ball valve will be off its seat on the tank 43 and the tank 43 will be empty and the float will be in its lower position as shown in full lines in Fig. 1, at which time the float lever has moved the valve 15 to open position and has moved the button 28 up against the contact 26 and said contact against the contact 26' so that as the water flows through nozzles 9 it is mixed with the ozonized air and the ozonized water passes into the tank 38 and continues to flow until it reaches the level shown in full lines. As the level of the ozonized water rises in the tank 38, it carries the ball valve upwardly until the head 49 engages with the seat 50 to close off the bottom of the tank 43. When the water reaches its highest level in the tank 38, which is determined by the vertical adjustment of the tank 43, it overflows into the empty tank 43 and fills said tank, thereby raising the float 57 which in turn swings the lever 54 to the dotted line position shown in Fig. 1. The movement of the lever to this position brings the valve 15 against its seat and thus shuts off the water supply and simultaneously the pressure on the switch button 28 is relieved and the switch is opened cutting off the electric current to the ozonizing apparatus. As the ozonized water is drawn off from the tank 38 the level of the water in said tank drops but the float remains in its upper "shut off" position until the water is released from the float tank 43 which occurs when the level of the water in the main tank 38 has dropped to such an extent as to cause the weight of the water in the tank 43 to open the ball valve, which action occurs at about the time the water in the main tank 38 has reached the level shown in dotted lines in Fig. 1, after which the operation of filling the tank with ozonized water is repeated.

While the float might be mounted in the main tank the auxiliary float tank 43 gives a quicker action to the water valve and switch and does not operate on slight fluctuations of water level in the main tank.

Various changes may be made in construction and arrangement of parts shown without departing from the spirit and scope of the invention, and I therefore desire it to be understood that this invention is not limited to any specific form or arrangement of parts except as such limitations are specified in the claims.

What I claim as new and desire to secure by Letters Patent is:

1. In an ozonizing apparatus, the combination, with a supply pipe, of a receiving tank, a mixing nozzle for discharging ozonized water into said tank, a drip trough disposed below the nozzle, a drain pipe for said trough, an outlet pipe leading from the tank, an electric switch for controlling the flow of current to the ozonizer, and float controlled means for controlling the switch and the passage of water through said nozzle.

2. The combination, with a storage tank and an ozonizing apparatus discharging ozonized water into said tank, of means automatically operable in response to a change in water level in the tank for operating the ozonizing apparatus only at such times as to supply ozonized water to the tank in large quantities and preventing its operation until a large quantity is again needed, so as to conserve the use of current in the ozonizer.

In testimony whereof I affix my signature, in presence of two witnesses.

WILLIAM G. LINDEMANN.

Witnesses:
GERTRUDE A. SCHOENECKER,
OTTO L. LUNDGREN.